United States Patent
Jayaraman et al.

(10) Patent No.: US 11,700,556 B2
(45) Date of Patent: Jul. 11, 2023

(54) CELL-BASED BACKUP FOR RECOVERING FROM SYSTEM FAILURES IN A MULTI-TENANT COMPUTING SYSTEM

(71) Applicant: Okta, Inc., San Francisco, CA (US)

(72) Inventors: Vinoth Jayaraman, Dublin, CA (US); Preston Chan, San Francisco, CA (US); Ryan Oblak, San Francisco, CA (US); Nishant Rimal, San Francisco, CA (US)

(*) Notice: Subject to any disclaimer, the term of this patent is extended or adjusted under 35 U.S.C. 154(b) by 0 days.

(21) Appl. No.: 17/163,131

(22) Filed: Jan. 29, 2021

(65) Prior Publication Data

US 2022/0248284 A1    Aug. 4, 2022

(51) Int. Cl.
- *H04W 36/00* (2009.01)
- *H04W 36/28* (2009.01)
- *H04W 36/30* (2009.01)

(52) U.S. Cl.
CPC ..... *H04W 36/00835* (2018.08); *H04W 36/28* (2013.01); *H04W 36/30* (2013.01)

(58) Field of Classification Search
CPC ........... H04W 36/00835; H04W 36/28; H04W 36/30
See application file for complete search history.

(56) References Cited

U.S. PATENT DOCUMENTS

| | | | | |
|---|---|---|---|---|
| 10,503,613 | B1* | 12/2019 | Moses | H04L 67/59 |
| 2006/0036761 | A1* | 2/2006 | Amra | H04L 67/1095 709/238 |
| 2012/0317291 | A1* | 12/2012 | Wolfe | G06Q 10/06 715/234 |
| 2016/0219015 | A1* | 7/2016 | Rugged | H04L 9/40 |
| 2017/0244593 | A1* | 8/2017 | Rangasamy | H04L 61/3015 |
| 2020/0403847 | A1* | 12/2020 | Goodman | H04L 43/0882 |
| 2020/0403870 | A1* | 12/2020 | Goodman | H04L 41/0896 |

OTHER PUBLICATIONS

Dnsimple, "Differences Among A, CNAME, ALIAS, and URL records," Date Unknown, [Online] [Retrieved on Mar. 8, 2021] Retrieved from the Internet <URL: https://support.dnsimple.com/articles/differences-between-a-cname-alias-url/>.

(Continued)

*Primary Examiner* — Hashim S Bhatti
(74) *Attorney, Agent, or Firm* — Holland & Hart LLP

(57) ABSTRACT

A multi-tenant computing system provides services to a number of different tenant organizations. To address the problem of failure of portions of the system, the hardware infrastructure of the system is located at a number of different geographical locations. The various tenants are assigned to one of a set of "cells," each cell corresponding to one of the geographical locations. Additionally, each cell has another one of the cells assigned to it as a backup cell, and the data of each cell is replicated within its assigned backup cell. At system run time, if a failure is detected within one of the cells, the network redirection is used within the multi-tenant system to reflect that the backup cell for the failing cell is now handling requests for the failing cell. Upon determination that the failing cell has been repaired and is now again correctly functioning, the network redirection is no longer employed, such that the (formerly) failing cell again handles its own requests.

15 Claims, 4 Drawing Sheets

(56) References Cited

OTHER PUBLICATIONS

Linse, J., "What is Active/Active, and How Can it Improve Business Continuity?," Dec. 17, 2012, six pages, [Online] [Retrieved on Mar. 8, 2021] Retrieved from the Internet <URL: https://infocus.delltechnologies.com/john_linse/what-is-activeactive-and-how-can-it-improve-business-continuity/>.

Packt, "Multi-site active-active," Date Unknown, [Online] [Retrieved on Mar. 8, 2021] Retrieved from the Internet <URL https://subscription.packtpub.com/book/virtualization_and_cloud/9781789130669/8/ch08lvl1sec73/multi-site-active-active>.

Wikipedia, "Disaster recovery," last edited Jan. 7, 2021, ten pages, [Online] [Retrieved on Mar. 8, 2021] Retrieved from the Internet <URL: https://en.wikipedia.org/wiki/Disaster_recovery>.

* cited by examiner

CELL-BASED BACKUP FOR RECOVERING FROM SYSTEM FAILURES IN A MULTI-TENANT COMPUTING SYSTEM

FIELD OF ART

The present invention generally relates to the field of distributed computing systems, and more specifically, to recovering from a system failure within a part of a distributed computing system.

BACKGROUND

Computing systems are subject to occasional failure, such as hardware failures (e.g., physical storage media or network connections breaking down) or software failures (e.g., faulty updates). In such cases, it is critical to address the failure and restore service as quickly as possible. Some attempts to address the problem of system failure are simple and inexpensive to implement but are unable to quickly restore service in the event of system failure; others provide quicker restoration but are complex and costly to implement. What is needed is a balanced approach that is able to restore service very quickly, but without high cost and complexity.

SUMMARY

A multi-tenant computing system provides services to a number of different tenant organizations ("tenants"). To address the problem of failure of portions of the system, the hardware infrastructure of the system (e.g., server hardware) is located at a number of separate geographical locations. The various tenants are assigned to one of a set of "cells," each cell corresponding to one of the geographical locations. Additionally, each cell has another one of the cells assigned to it as a backup cell that will take over its operation if that cell encounters a system failure that prevents it from properly operating, and the data of each cell is replicated within its assigned backup cell.

At system run time, if a failure is detected within one of the cells, the multi-tenant system uses redirection within the network to reflect that the backup cell for the failing cell is now handling requests for the failing cell. Upon determination that the failing cell has been repaired and is now again correctly functioning, the redirection is no longer employed, such that the (formerly) failing cell again handles its own requests.

Advantageously—particularly relative to a dedicated "clone" backup system—the above-described recovery scheme minimizes the need for additional computing resources (e.g., memory, CPU processing time, network bandwidth, etc.), since the existing infrastructure for a backup cell can be shared between the backup cell and the cell that it backs up, thereby lessening the need for additional resources. Further, the time required to restore service to tenants within the failing cell is minimal, only requiring an update of addressing information to point to the backup cell. Finally, the recovery scheme is robust, since by using a cell already functioning on its own as backup for a failing cell, it is known that the backup is already in working order. In contrast, a recovery scheme that replicated data and hardware to a dedicated "clone" backup system would run the risk that the clone would encounter its own failures when deployed as a backup, since it has not been continuously tested within the real-world system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1A:
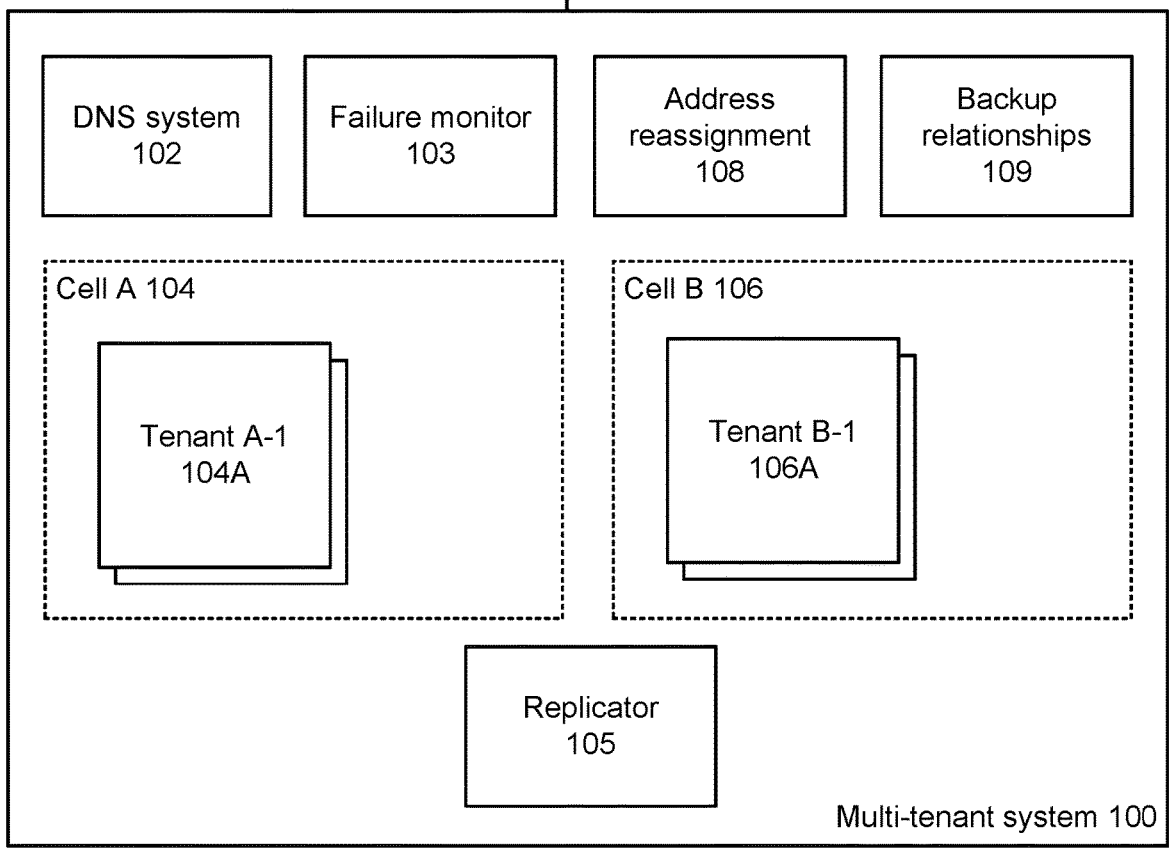
FIG. 1A illustrates one embodiment of a computing environment in which a multi-tenant system provides services for a number of different tenants in a manner that can gracefully fail over if the portion of the infrastructure for a given tenant fails.

FIG. 1A illustrates one embodiment of a computing environment in which a multi-tenant system 100 provides services for a number of different tenants in a manner that can gracefully fail over if the portion of the infrastructure for a given tenant fails. The multi-tenant system 100 may span any geographical area, such as servicing a wide area including many different countries on many different continents. Users 129 use their client computing devices 121 (hereinafter "client devices") to obtain services from the multi-tenant system 100 on behalf of the tenants (e.g., employers) with whom the users are associated.

The hardware infrastructure of the multi-tenant system 100 is distributed geographically so as to serve users 129 in different locations. (As described herein, the "location(s)" of the multi-tenant system refers to the geographic location or locations at which the hardware infrastructure (e.g., servers) of the multi-tenant system 100 is located.) As one specific example, the multi-tenant system might be geographically located at five different locations in North America and six different locations in Asia, each geographic location constituting one cell. In the example of FIG. 1A, only two cells are displayed for the sake of simplicity of example: a first cell (Cell A 104) and a second cell (Cell B 106), although in practice there may be any number of cells within a multi-tenant system 100. In some embodiments, the cells correspond to physical hardware of the multi-tenant system 100; in other embodiments, the cells correspond at least in part to virtual systems controlled by the multi-tenant system but hosted on the hardware of a third-party provider, such as AMAZON WEB SERVICES.™

Each cell services some number of distinct tenants, illustrated as tenants 104A and tenants 106A. Typically, the tenants of a cell are physically located nearer to that cell than to any of the other cells, so as to minimize network latencies, although a tenant may also be assigned to a cell other than the cell most geographically close to it. A cell may have any number of tenants (although only two are illustrated in FIG. 1A for the sake of simplicity), and the cells may have different numbers of tenants. The tenants represent organizations that use the resources of the a cell to obtain services, and thus are not within the multi-tenant system 100 in a physical sense, but rather are conceptually part of the cells, in that they obtain services from the resources of their respective cells. In the simplified example of FIG. 1A, for example, a first Company A and a second Company B could be the two tenants of Cell A 104, and a third company C and a fourth Company D could be the two tenants of Cell B 106.

The multi-tenant system 100 additionally includes a Domain-Name System (DNS) 102, a backup relationships list 109, a replicator module 105, and an network redirection module 108, and may include a failure monitor 103.

The DNS system 102 assigns specific IP addresses to conceptual domain names. Each tenant of the multi-tenant system may be assigned its own domain name (e.g., companyA.multitenantsystem.com for Company A) for the convenience of the users of the tenant, and the DNS system may assign each such domain name one or more corresponding IP addresses.

The backup relationships list 109 indicates, for each cell of the multi-tenant system, another one of the cells that acts as a backup for that cell in case of a failure of that cell. The backup relationship between cells need not be symmetric. That is, Cell A may be backed up by Cell B, but Cell B need not be backed up by Cell A. Additionally, some cells may be backup cells for multiple other cells.

The network redirection module 108 establishes redirection within its network (e.g., updates the address records of the multi-tenant system 100) in response to determinations that one or more of the tenants in one the cells is in a failure state (i.e., is encountering errors that significantly hinder its ability to respond to requests directed to it), such that the backup for the cell (as indicated by the backup relationships list 109) is used to respond to requests directed to the cell. In some embodiments, the network redirection module 108 achieves this by modifying the records of the DNS system 102 so that the DNS system maps the domain name(s) for the affected tenants to a domain name corresponding to the backup cell. This can be achieved by using DNS CNAME records. For example, if Cell A is in a failure state such that the domain name companyA.multitenantsytem.com cannot be accessed (e.g., because servers used to communicate with the IP addresses to which the domain name is mapped are experiencing physical or logical malfunctions), Cell B is the designated backup cell for Cell A, and the domain name cellB.multitenantsystem.com is mapped to a Cell B IP address in the DNS records, then the network redirection module 108 could modify the records of the DNS system 102 so that a CNAME record maps the domain name companyA.multitenantsytem.com to cellB.multitenantsystem.com. In some embodiments, the network redirection module 108 alternatively and/or additionally uses a proxy (e.g., AWS Global Accelerator™) to accomplish the address reassignment. (In this embodiment, FIG. 1 is supplemented with an "accelerator" system or other proxy intermediary between the multi-tenant system 100 and the network 140, which re-routes requests to backups upon cell failure.) As opposed to a DNS CNAME approach, the proxy approach provides the additional benefit of avoiding local client caches of DNS records that would become inconsistent once the records of the DNS system 102 were updated, and that would otherwise increase the time required to switch over to use of Cell B.

The network redirection module 108 also updates the address records of the multi-tenant system 100 in response to determinations that cell failures have been resolved. For example, in embodiments adding DNS CNAME records to address cell failures, the DNS CNAME records that were created are removed once the respective cells are determined to be working properly once again. In embodiments using a proxy, the routing is adjusted so as to again send to the original cell rather than its backup.

In some embodiments, the multi-tenant system 100 has a failure monitor module 103 that automatically determines that a cell is in a failure state. For example, the failure monitor module 103 can compute a metric such as average request latency or request failure rate, and if the metric is at at least some threshold level, can conclude that the associated cell is in a failure state. In other embodiments, a human user (such as an administrator) of the organization 120 can alternatively or additionally manually specify that a given cell is in a failure state.

The replicator module 105 is used in a preliminary phase to ensure that the necessary data and logic from each cell is replicated to that cell's corresponding backup cell, and that access to any external resources used by Cell A is also made available to Cell B. For example, if a given cell has 3 tenants, the databases—and any other data (e.g., procedural code such as JavaScript™) that constitute a working application that can respond to user requests—are copied to the backup cell so that the backup cell is ready to take over immediately upon a failure of the cell for which it acts a backup. (Note that although for simplicity of discussion the user data 101 has been illustrated in FIG. 1 as being distinct from the cells 104 and 106, in practice in most embodiments the user data 101 are part of the data for the various cells and are replicated to the backup cells along with the other data.) Replicated data may also include encryption keys and/or access to external resources, such as storage of a cloud provider (e.g., S3™ buckets). In some embodiments, the replicator module 105 replicates only a more important subset of the functionality of the tenants (e.g., as indicated by metadata specified by the tenants), so that critical functionality is preserved and infrastructure costs are less than they would otherwise be if all functionality was replicated.

Figure 1B:
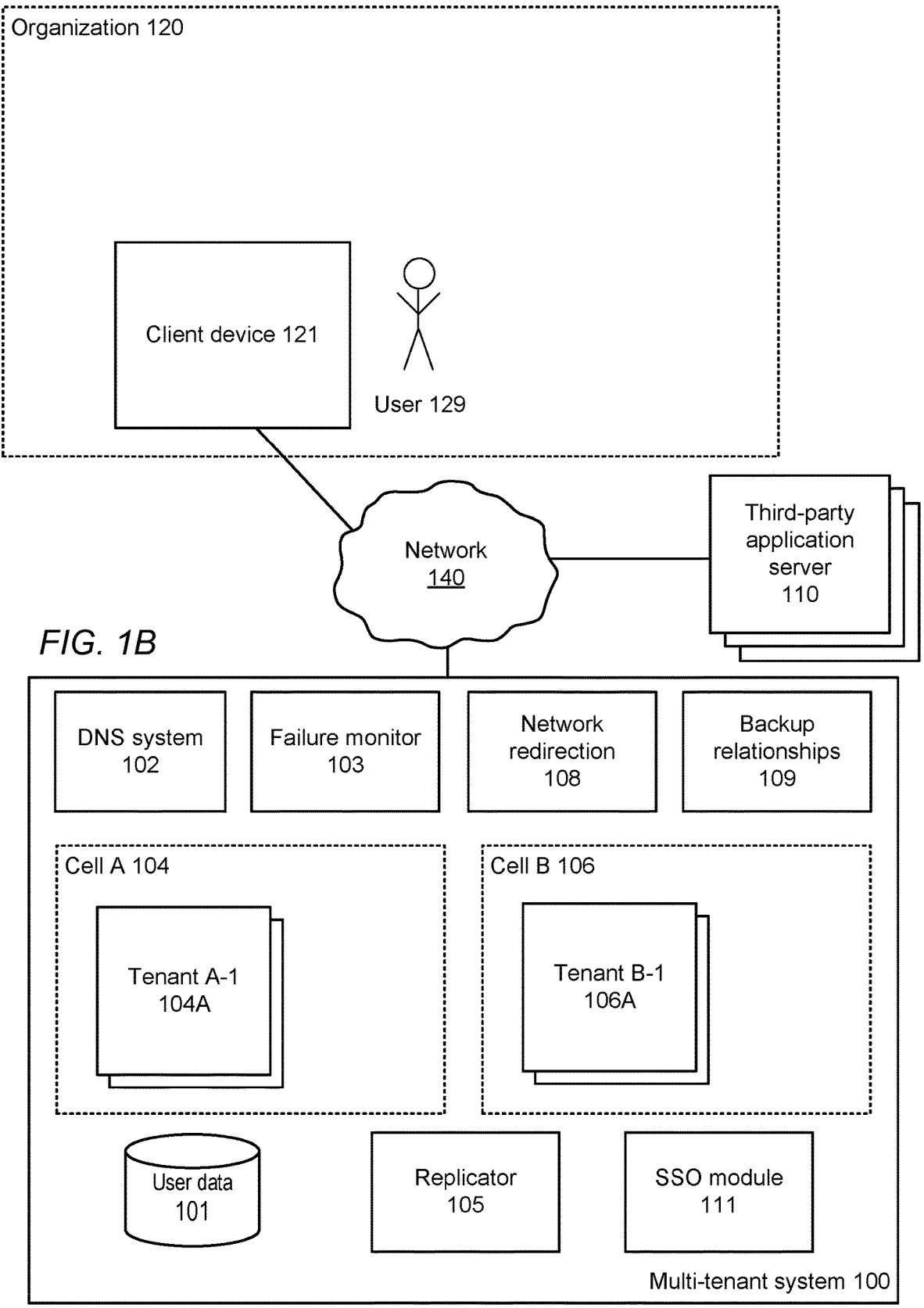
FIG. 1B illustrates one specific embodiment of the computer environment of FIG. 1A, in which the multi-tenant system provides identity provider services and single-sign on functionality to its tenant organizations

FIG. 1B illustrates one specific embodiment of the computer environment of FIG. 1A, in which the multi-tenant system 100 provides identity provider services and single-sign on functionality to its tenant organizations (e.g., corporations, schools, and the like). The organizations 120 each have various members (e.g., the user 129) such as employees or volunteers, and the members may accomplish tasks on behalf of the organization using their client devices 121. The users may have multiple accounts on different systems, and the systems may be owned and/or administered by different independent entities, such that the users may have a number of different identities—and corresponding credentials—across the different systems. The different accounts may provide the users with access to different resources, such as (for example) applications (e.g., email applications, timekeeping applications, spreadsheet applications, etc.) like the applications 110 depicted in FIGS. 1A and 1B, databases, files systems, or the like. Since each application 110 or other resource could be from a different provider—each of which could have a different identity for a user—a single user will typically have many different identities and associated credentials corresponding to the different resources that the user uses. The multi-tenant system 100 provides users with a federated identity integrating the users' different identities on different accounts, thereby providing more convenient, efficient, and secure access to the different accounts.

The multi-tenant system 100 provides the user 129 with a federated identity linking the various identities of the user on the different accounts (e.g., the applications 110) or other resources to which the user has access. The multi-tenant system 100 stores user data 101 that include a set of identities of known users with accounts on the multi-tenant system 100. The user data 101 may include a form of identity on the multi-tenant system 100 such as a username, as well as other credential data associated with a user, such as a user password or information derived therefrom. The user data 101 may also include many other types of data about users, such as the factor types and providers that they may use when seeking identity verification from the multi-tenant system 100, their role(s) or group(s) within the organization 120 to which they belong (e.g., "Engineering", "Legal", "Manager 2", "Director", or the like), and/or the resources to which they have access (e.g., third-party applications 110), as some examples. The user data 101 may also include identities and credentials of the various users on the various accounts to which they have access, thereby linking a user's identity on the multi-tenant system 100 to the user's identities on those different accounts and (by extension) permitting access to those accounts. In some embodiments, the multi-tenant system 100 is part of the organization 120, rather than being an independent entity as it is in other embodiments.

Software on the client device 121 facilitates providing users with federated identities by securely and transparently communicating with the multi-tenant system 100 that handles the details of identity federation and provides related identity services. In this way, the users of the organization 120 simply and securely obtain access to the various third-party accounts or other resources that they need to complete tasks on behalf of the organization. The software on the client device 121 that communicates with the multi-tenant system 100 may (although need not) be provided by the entity responsible for the multi-tenant system.

In some embodiments, the multi-tenant system 100 includes a single sign-on (SSO) module 111 that allows the multi-tenant system to transparently log a user in to the different accounts or other resources to which the user has access. For example, for a given user who has logged in to the multi-tenant system 100, the SSO module 111 can look up the user's accounts or other resources within the user data 101, as well as the user's credentials for those accounts. Using the credentials, as well as metadata or other information about the accounts, the SSO module 111 can automatically log the user into the applications 110 or other resources described in the user data 101, such as by establishing application sessions with the various applications and providing corresponding session data (e.g., session tokens) to the device 121. Thus, with a single login to the multi-tenant system 100, the SSO functionality of the multi-tenant system provides a user with automatic access to all the user's accounts or other resources.

Physically, the organization 120 is made up of a number of computing systems, including the various client devices 121; one or more internal networks that connects the computing systems, including routers or other networking devices that define the boundary between the organization and external networks; and the like.

Similarly, the multi-tenant system 100, although depicted as a single logical system in FIGS. 1A and 1B, may be implemented using a number of distinct physical systems and the connections between them, such as application servers, database servers, load-balancing servers, routers, and the like.

The network 140 may be any suitable communications network for data transmission. In embodiments such as those illustrated in FIG. 1A or 1B, the network 140 uses standard communications technologies and/or protocols and can include the Internet. In another embodiment, the entities use custom and/or dedicated data communications technologies.

Figure 2:
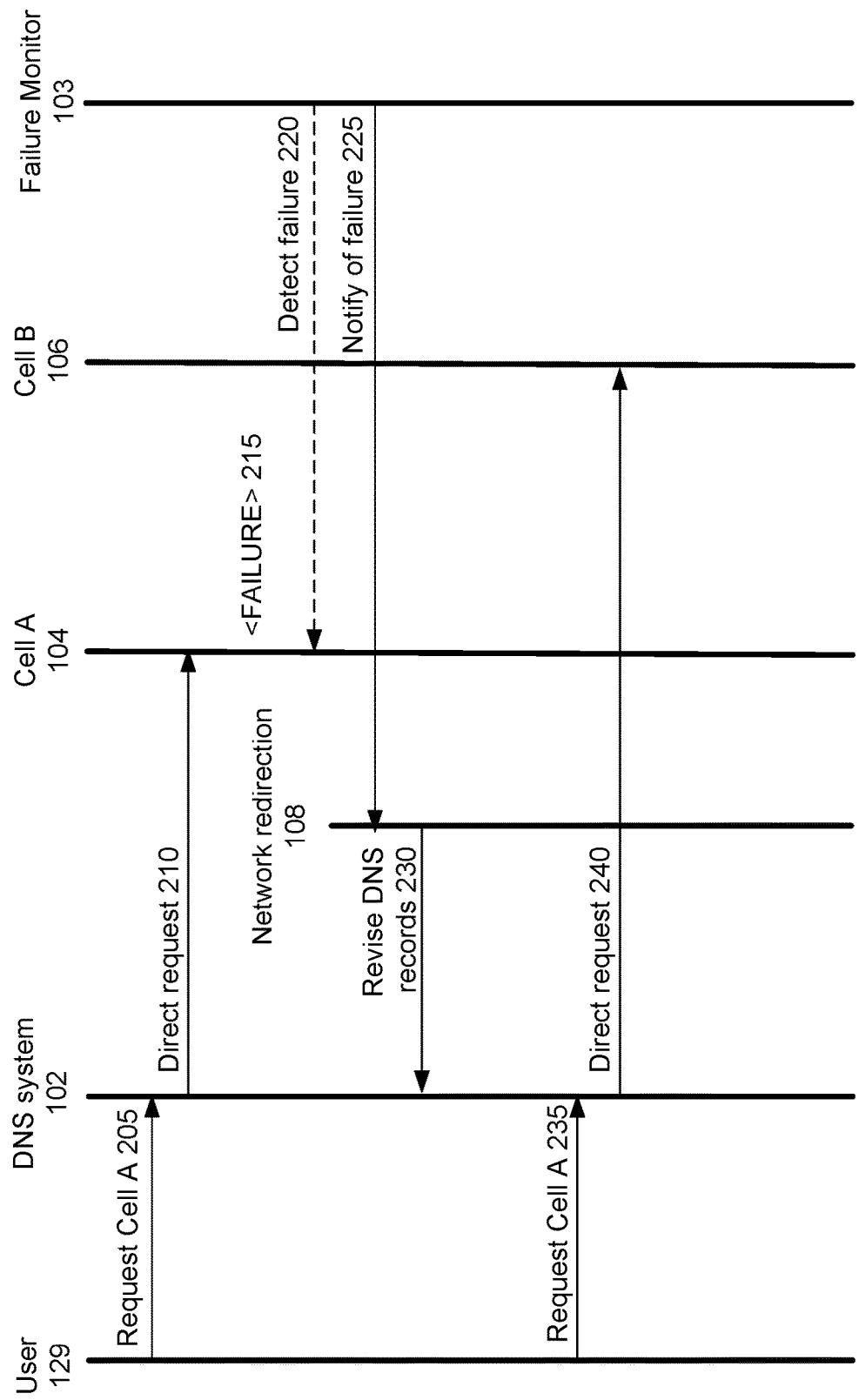
FIG. 2 illustrates interactions taking place when handling a request for a first cell when the cell is properly functioning, and when responding to a cell failure, according to some embodiments in which modification of DNS entries is used to achieve failover.

FIG. 2 illustrates interactions taking place when handling a request for a first cell when the cell is properly functioning, and when responding to a cell failure, according to some embodiments in which the network redirection module 108 modifies DNS entries to achieve failover.

Initially, the infrastructure of Cell A 104 is functioning properly. Accordingly, when a user 129 uses his or her client device 121 to send a request 205 to a tenant hosted within Cell A 104, the DNS system 102 provides an IP address that directs 210 the request to Cell A 104, where the request is analyzed and responded to.

At some later point, a failure 215 occurs within the infrastructure of Cell A 104 that substantially prevents Cell A from properly responding to user requests directed to its tenants. The failure monitor module 103 detects 220 the failure and notifies 225 the addressing reassignment module 108, which in turn revises 230 the records of the DNS system 102, e.g., by updating a CNAME record that maps domain names of Cell A to Cell B. Alternatively, a user could manually notice the failure and notify 225 the network redirection module 108.

Thereafter, when the user 129 (or a different user) sends a request 235 to a tenant hosted within Cell A 104, the DNS system provides an IP address that directs 240 the request to Cell B 106, rather than Cell A. Since the replicator module 105 had earlier replicated the data of Cell A to Cell B, Cell B is able to service the request for Cell A.

When Cell A is no longer in a failure state, the failure monitor 103 (or a human user) can so notify the network redirection module 108, which removes the CNAME record mapping Cell A to Cell B, thereby allowing requests for Cell A to be delivered to Cell A rather than Cell B.

In other embodiments (such as those employing a proxy rather than DNS modification), the interactions are largely similar, though the network redirection module 108 establishes the proxy rather than revising DNS records at step 230.

Figure 3:
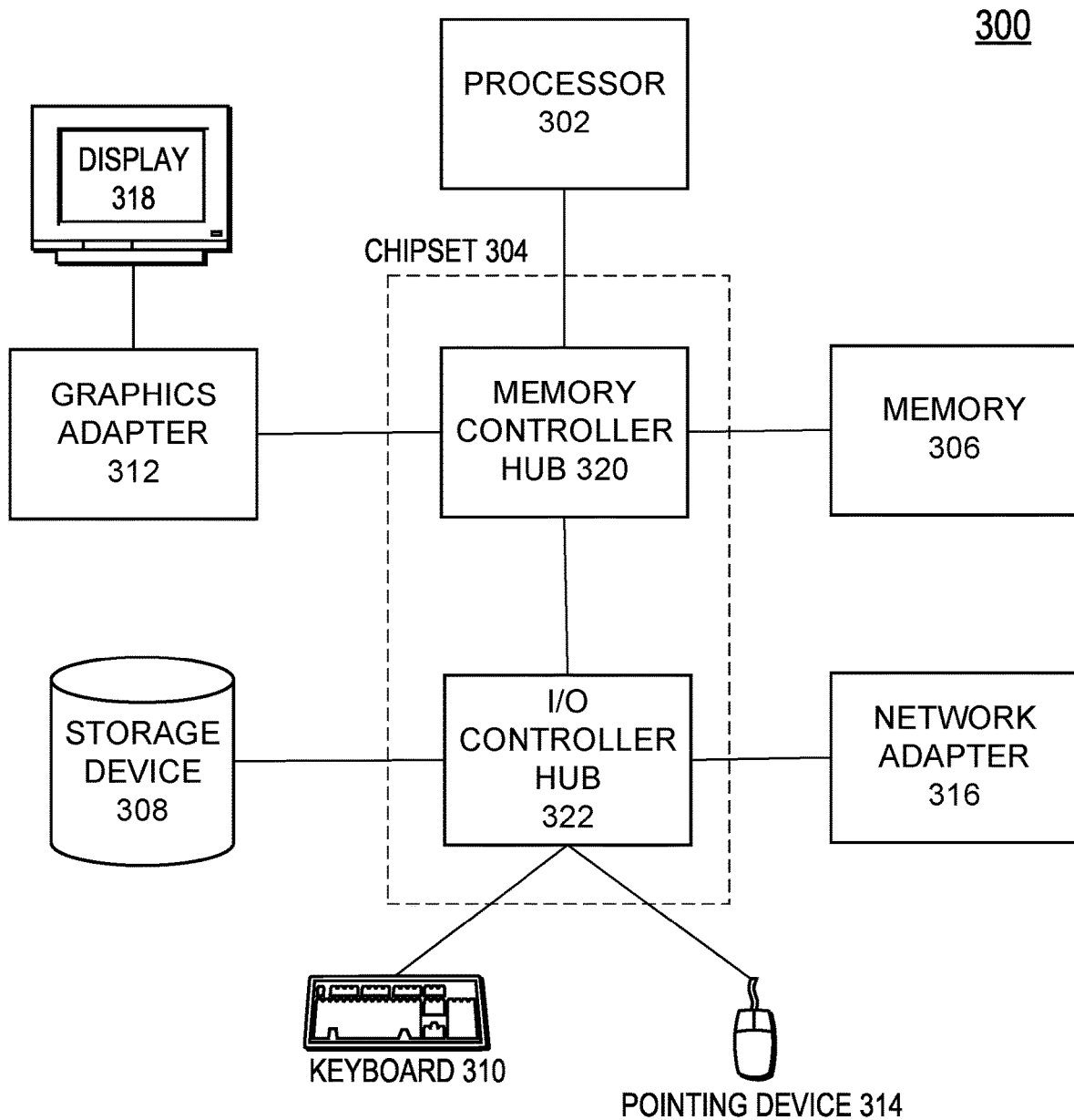
FIG. 3 is a high-level block diagram illustrating physical components of a computer 300 used as part or all of (for example) the multi-tenant system, the client device, and/or the third-party application server of FIGS. 1A and 1B, according to one embodiment.

FIG. 3 is a high-level block diagram illustrating physical components of a computer 300 used as part or all of (for example) the multi-tenant system 100, the client device 121, and/or the third-party application server 110, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard 310 or pointing device 314. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for failure recovery in a distributed multi-tenant system comprising a plurality of tenants, each tenant being an organization having a plurality of users and having an associated server and database and belonging to a corresponding cell from a plurality of cells each comprising one or more servers and one or more databases, the computer-implemented method comprising:

for each cell of the plurality of cells:
assigning one of the plurality of cells to serve as a backup to the cell, the cell being geographically separate from the backup cell, the backup cell handling client requests for the cell while it is assigned as backup for the cell, and
replicating the databases of the tenants of the cell to the backup cell; and
receiving, from a user of a first one of the organizations, a request for single sign-on to a plurality of third-party applications to which the user has access via the organization;
responsive to detecting failure in a first cell of the plurality of cells responsible for performing the single sign-on:
identifying a first backup cell for the first cell;
using network redirection within the multi-tenant system to cause the request to be delivered to the first backup cell, such that the backup cell handles both requests for the first cell and requests for the first backup cell; and
the first backup cell transparently signing the user on to the plurality of third-party applications to which the user has access.

2. The computer-implemented method of claim 1, further comprising:
responsive to detecting that the failure in the first cell has been repaired:
ceasing to use the network redirection, such that the first cell handles requests for the first cell and the first backup cell handles requests for the first backup cell.

3. The computer-implemented method of claim 1, wherein each of the tenants is assigned to exactly one of the cells.

4. The computer-implemented method of claim 1, further comprising detecting the failure in the first cell by computing a metric comprising at least one of average request latency for the first cell or request failure rate for the first cell.

5. The computer-implemented method of claim 1, wherein using network redirection comprises modifying a DNS CNAME record.

6. A non-transitory computer-readable storage medium storing instructions for failure recovery in a distributed multi-tenant system comprising a plurality of tenants, each tenant being an organization having a plurality of users and having an associated server and database and belonging to a corresponding cell from a plurality of cells each comprising one or more servers and one or more databases, the instructions when executed by a computer processor performing actions comprising:
for each cell of the plurality of cells:
assigning one of the plurality of cells to serve as a backup to the cell, the cell being geographically separate from the backup cell, the backup cell handling client requests for the cell while it is assigned as backup for the cell, and
replicating the databases of the tenants of the cell to the backup cell; and
receiving, from a user of a first one of the organizations, a request for single sign-on to a plurality of third-party applications to which the user has access via the organization;
responsive to detecting failure in a first cell of the plurality of cells responsible for performing the single sign-on:
identifying a first backup cell for the first cell;
using network redirection within the multi-tenant system to cause the request to be delivered to the first backup cell, such that the backup cell handles both requests for the first cell and requests for the first backup cell; and
the first backup cell transparently signing the user on to the plurality of third-party applications to which the user has access.

7. The non-transitory computer-readable storage medium of claim 6, the actions further comprising:
responsive to detecting that the failure in the first cell has been repaired:
ceasing to use the network redirection, such that the first cell handles requests for the first cell and the first backup cell handles requests for the first backup cell.

8. The non-transitory computer-readable storage medium of claim 6, wherein each of the tenants is assigned to exactly one of the cells.

9. The non-transitory computer-readable storage medium of claim 6, the actions further comprising detecting the failure in the first cell by computing a metric comprising at least one of average request latency for the first cell or request failure rate for the first cell.

10. The non-transitory computer-readable storage medium of claim 6, wherein using network redirection comprises modifying a DNS CNAME record.

11. A multi-tenant system having a plurality of tenants, each tenant being an organization having a plurality of users and having an associated server and database and belonging to a corresponding cell from a plurality of cells each comprising one or more servers and one or more databases, the multi-tenant system comprising:
a computer processor; and
a non-transitory computer-readable storage medium storing instructions that when executed by the computer processor performing actions comprising:
for each cell of the plurality of cells:
assigning one of the plurality of cells to serve as a backup to the cell, the cell being geographically separate from the backup cell, the backup cell handling client requests for the cell while it is assigned as backup for the cell, and
replicating the databases of the tenants of the cell to the backup cell; and
receiving, from a user of a first one of the organizations, a request for single sign-on to a plurality of third-party applications to which the user has access via the organization;
responsive to detecting failure in a first cell of the plurality of cells responsible for performing the single sign-on:
identifying a first backup cell for the first cell;
using network redirection within the multi-tenant system to cause the request to be delivered to the first backup cell, such that the backup cell handles both requests for the first cell and requests for the first backup cell; and
the first backup cell transparently signing the user on to the plurality of third-party applications to which the user has access.

12. The multi-tenant system of claim 11, the actions further comprising:
responsive to detecting that the failure in the first cell has been repaired:
ceasing to use the network redirection, such that the first cell handles requests for the first cell and the first backup cell handles requests for the first backup cell.

13. The multi-tenant system of claim 11, wherein each of the tenants is assigned to exactly one of the cells.

14. The multi-tenant system of claim 11, the actions further comprising detecting the failure in the first cell by computing a metric comprising at least one of average request latency for the first cell or request failure rate for the first cell.

15. The multi-tenant system of claim 11, wherein using network redirection comprises modifying a DNS CNAME record.

\* \* \* \* \*